Patented Mar. 29, 1938

2,112,445

UNITED STATES PATENT OFFICE 2,112,445

HETEROCYCLIC PHENOLS

Joseph B. Niederl, New York, N. Y.

No Drawing. Application March 24, 1936,
Serial No. 70,613

7 Claims. (Cl. 260—44)

This invention relates to a new class of chemical compounds and to a process by which they can be prepared. More specifically, it relates to oxazoline and thiazoline phenols that are prepared by condensing ethylenic isocyanates or isothiocyanates with phenols in the presence of a cationoid condensing agent.

It has heretofore been known that unsaturated aliphatic hydrocarbons can be condensed with phenols to produce alkyl substituted phenols. Such a process is disclosed in my prior Patent 2,008,032 granted July 16, 1935. I have now found that when ethylenic isocyanates or isothiocyanates are condensed with phenols the condensation takes place not at the ethylenic group as would be expected, but in the cyanate radical and is followed by a ring closure that forms an oxazoline or thiazoline group. Thus, according to this invention, compounds of the structural formula

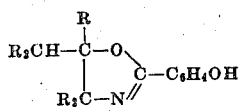

are produced by condensing an unsaturated alkylene isocyanate with phenol. Where an unsaturated alkyl isothiocyanate is used, compounds of the general formula

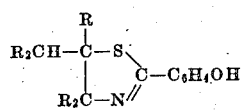

are produced.

In practicing this invention molecular equivalent quantities of a phenol and an ethylenic isocyanate or isothiocyanate are mixed and to the mixture approximately one molecular equivalent of a cationoid condensing agent is slowly added while the reaction mass is thoroughly agitated and cooled to a temperature in the neighborhood of 0° C. After all the condensing agent is added, the mixture is allowed to stand for one or more days until the reaction is complete. The new condensation products can be separated from the reaction mass by extracting with a small amount of water and are recovered from the extracting solution by neutralizing with alkali hydroxide or carbonate. Further purification can be effected by extracting the recovered condensation product with an organic solvent and removing the solvent and other volatile materials by vacuum distillation. By this method oxazoline and thiazoline phenols can be prepared by condensing any β-ethylenic isocyanate or isothiocyanate with any phenol having a free reactive nuclear position available for condensation.

By the expression "β-ethylenic isocyanate" I intend to include compounds of the general formula $R_2C=CR—CR_2—NCO$ wherein the R's are similar or different and may be hydrogen or a saturated alkyl or cycloalkyl group. The expression "β-ethylenic isothiocyanates" is intended to include the corresponding group of isothiocyanates.

The expression "cationoid condensing agent" is used herein in the sense of the recent electronic postulations of Robert Robinson; compare for instance his book on "Versuch einer Elektronentheorie organisch-chemischer Reaktionen", Verlag Ferdinand Enke, Stuttgart 1932, especially page 16. Such agents are protons and sources of protons, such as acids, or metal atoms which are able to form coordination systems with water or ammonia, or atoms and free radicals with incomplete electron shells. Especially suitable have been found the following agents: sulphuric acid, hydrochloric acid, hydrobromic acid, phosphoric acid, zinc chloride, aluminum chloride, boron trifluoride, copper chloride, and other cationoid agents. They do not enter into reaction with the above mentioned reaction compounds but remain unchanged and act, thus, catalytically.

The following examples are given as specific illustrations of how my invention may be carried out and should not be construed as limitations thereupon:

*Example 1.*—Allyl isocyanate and phenol—To a molar mixture of allyl isocyanate and phenol not more than one mol. equivalent of conc. sulphuric acid is added, the temperature of the reaction mixture being kept between 0–5° C. After the addition of the acid the mixture is allowed to stand for several days until the reaction is complete. The condensed material is then extracted with water to remove any and all water soluble, as well as acid soluble, material. This extract is then neutralized with sodium carbonate or sodium hydroxide. The oxazolinephenol separates as an oil which is then dissolved in ethyl acetate and dried over anhydrous calcium chloride. The extract is then filtered and the ethyl acetate, together with the lower distilling starting materials as well as by-products, is removed by distillation under diminished pressure. The residue is once more dissolved in ethyl acetate or any other non-reactive organic solvent and this extract is treated with dilute hydrochloric acid (10%) and the acidic aqueous extract is again separated. This acidic extract is then filtered and carefully neutralized with sodium hydroxide or carbonate. The oxazolinephenol first separates out in form of finely divided oily droplets which soon crystallize. Recrystallization is effected by dissolving the crude condensation product in a minimum of ethyl alcohol, Norite being used to remove colored impurities.

*Example 2.*—Allyl mustard oil and phenol—To a mixture consisting of one-half mol. of allyl mustard oil and one mol. of phenol, cooled to 0–5° C. one mol. of conc. sulphuric acid, kept at the same temperature, is slowly added under constant stirring or agitation. The same low temperature is maintained not only throughout the entire addition of the condensing agent, but also for the next 24 hours, after which the reaction mixture is left standing for 3 days at room temperature to bring the reaction to completion. The condensation product is then treated with small amounts of water to extract the sulphuric acid as well as all acid soluble material. This aqueous extract is neutralized with sodium carbonate or sodium hydroxide and extracted exhaustively with ethyl acetate. The ethyl acetate extract is dried with anhydrous calcium chloride and filtered. The solvent, as well as most of the unreacted phenol, mustard oil and some allyl amine, are distilled off successively by gradually heating the condensation product to 110°/10 mm. The remaining residue is once more dissolved in ethyl acetate and this solution extracted with dilute hydrochloric acid (10%). The acidic aqueous extract obtained is neutralized with sodium hydroxide or carbonate and the separating oil usually crystallizes on standing, otherwise it is once more taken up in ethyl acetate. Again the solvent is removed by vacuum distillation and the residue dissolved in a minimum of 95% ethyl alcohol. On prolonged standing of this concentrated alcoholic solution at about 0° C. the respective phenolic condensation products crystallize. Recrystallization is effected by using ethyl alcohol or benzene, together with Norite for the removal of highly colored impurities.

Another way to crystallize these condensation products is by dissolving the acid soluble oil as obtained above, in a minimum amount of aqueous sodium or potassium hydroxide. The resulting aqueous alkaline solution is filtered and then neutralized exactly with sulfuric or hydrochloric acid. From this absolutely neutral solution, on standing, the thiazolinephenol first comes down in form of fine droplets and the entire mixture assumes a milky appearance. On further standing the thiazolinephenol thus precipitated, becomes crystalline. It is filtered off, and recrystallized as described before.

In similar manners any phenol having a nuclear position (ortho or para) available for reaction, such as the cresols, the xylenols, thymol, carvacrol, p-diisobutyl phenol, guaiacol, catechol, resorcinol, hydroquinone, pyrogallol, methyl salicylate, α- and β-naphthol, etc., can be condensed with allyl isocyanate, crotyl isocyanate, cinnamyl isocyanate, allyl mustard oil or any other beta unsaturated mustard oil such as α-crotyl mustard oil, or cinnamyl mustard oil.

The hydrochlorides of these condensation products can be prepared by evaporating to dryness a filtered solution of the phenolic condensation products in dilute hydrochloric acid (10%). Further purification is accomplished by precipitating the phenolic hydrochlorides from either alcoholic or aqueous solutions by the slow addition of acetone until decided turbidity is observed. The corresponding picrates are obtained by the slow addition of the filtered aqueous solutions of the hydrochlorides to an equal volume of a filtered concentrated aqueous solution of picric acid. They can be recrystallized from 95% ethyl alcohol.

Allyl mustard oil yields specifically:

(a) With phenol: 5-methyl-2-(4'-hydroxy)-phenyl thiazoline ($C_{10}H_{11}OSN$), M. P.: 166–168° C.: hydrochloride ($C_{10}H_{12}OSNCl$), M. P.: 187° C.: picrate ($C_{16}H_{14}O_8SN_4$), M. P.: 178° C.

(b) With m-cresol: 5-methyl-2-(2'-methyl-4'-hydroxy)-phenyl thiazoline ($C_{11}H_{13}OSN$), M. P.: 131° C.: hydrochloride ($C_{11}H_{14}OSNCl$), 175° C.: picrate ($C_{17}H_{16}O_8SN_4$), M. P.: 154° C.

(c) With p-diisobutylphenol: 5-methyl-2-(2'-hydroxy-5-(α, α, γ, γ-tetramethyl) butyl)-phenyl thiazoline ($C_{18}H_{27}OSN$).

(d) With guaiacol: 5-methyl-2-(4'-hydroxy-3'-methoxy)-phenyl thiazoline ($C_{11}H_{13}O_2SN$), M. P.: 142° C.: hydrochloride ($C_{11}H_{14}O_2SNCl$), M. P.: 187° C.: picrate ($C_{17}H_{18}O_9SN$), M. P.: 159–160° C.

(e) With resorcinol: 5-methyl-2-(2',4'-dihydroxy)-phenyl thiazoline ($C_{10}H_{11}O_2SN$), M. P.: 184° C.: hydrochloride ($C_{10}H_{12}O_2SNCl$), M. P.: 251° C.: picrate ($C_{16}H_{14}O_9SN_4$), M. P.: 190° C.

Oxydative degradation of the above thiazoline phenols yield first the corresponding phenolic heterocyclic sulfoxides

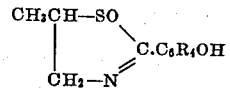

then the corresponding phenolic heterocyclic sulfones

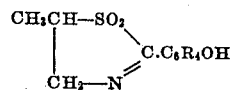

then the corresponding taurins

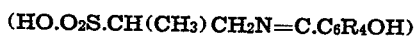

or taurin amides

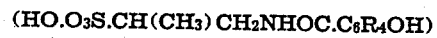

and finally β-methyl taurin. At the same time the phenolic radical is oxidized first to the corresponding phenolic aldehyde and then to the corresponding phenolic acid. In this way vanillin is obtained by oxidizing the thiazoline guaiacol compound.

As in the previous examples, the above process is not at all limited to the above mentioned specific examples, but any phenolic compound as well as any unsaturated isocyanate (yielding oxazoline phenols) or isothiocyanate may be used. For technical production of these thiazoline or oxazoline phenols the above experimental procedure, esecially the working up of the condensation products, may be widely varied, without departing from the scope of the invention.

These new thiazoline phenols exhibit both heterocyclic (basic) as well as phenolic properties. They are relatively non-toxic and have considerable pharmaceutical value. These thiazoline phenols couple normally with diazonium salts and a variety of new dye stuffs are thus prepared. Their oxydation products, the phenolic heterocyclic sulfoxides as well as the phenolic heterocyclic sulfones, also have considerable pharmaceutical values and at the same time are important azo dye stuff intermediates.

What I claim as my invention is:

1. A process which consists in treating a phenol having at least one free nuclear position available for condensation, with reacting proportions of a β-ethylenic isothiocyanate in the presence of an acidic catalyst as a condensing agent.

2. A process which consists in treating a phenol having at least one nuclear position available for condensation with reacting proportions of a β-ethylenic isothiocyanate in the presence of sulphuric acid.

3. A process which consists in treating a phenol having at least one nuclear position available for condensation with reacting proportions of allyl isothiocyanate in the presence of sulphuric acid.

4. As a new compound 5-methyl-2-(4'-hydroxy)-phenyl thiazoline.

5. Compounds of the general formula

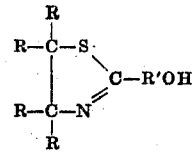

in which R represents a member of the group consisting of hydrogen and hydrocarbon radicals, and R' represents an aromatic nucleus.

6. As a new compound, 5-methyl-2-(2'-methyl-4'-hydroxy phenyl)-thiazoline.

7. As a new compound, 5-methyl-2-(2',4'-dihydroxy phenyl)-thiazoline.

JOSEPH B. NIEDERL.